G. H. DOWNS.
TROLLEY WHEEL.
APPLICATION FILED MAR. 24, 1908.

947,436.

Patented Jan. 25, 1910.

Witnesses:
A. D. Gerking
Cecil Long

Inventor:
George Henry Downs
by T. J. Geisler
Atty.

UNITED STATES PATENT OFFICE.

GEORGE HENRY DOWNS, OF NORTH POWDER, OREGON, ASSIGNOR OF ONE-HALF TO WILLIAM E. GRACE, OF PORTLAND, OREGON.

TROLLEY-WHEEL.

947,436.  Specification of Letters Patent.  Patented Jan. 25, 1910.

Application filed March 24, 1908. Serial No. 423,003.

*To all whom it may concern:*

Be it known that I, GEORGE HENRY DOWNS, a citizen of the United States, and a resident of North Powder, Union county, State of Oregon, have invented a new and useful Improvement in Trolley-Wheels, of which the following is a specification, reference being had to the accompanying drawings as constituting a part thereof.

My invention relates to the trolley-wheels of electric cars in connection with overhead trolley-wires, and has for its object to obtain a trolley-wheel with a wide flange arranged to prevent the wheel from leaving the trolley-wire, and at the same time to so contrive the wheel as to enable it to pass over the cross or stay wires by which the overhead trolley-wire is supported from the poles along the track.

I carry my object into effect by means of a trolley-wheel journaled intermediate of two rotatable sides constituting flanges for the trolley-wheel, and the rim of said flanges being arranged in the form of radially disposed spokes, so as to enable the trolley-wheel to climb over cross suspending-wires, the parts being combined and operating as hereinafter fully described.

Figure 1:
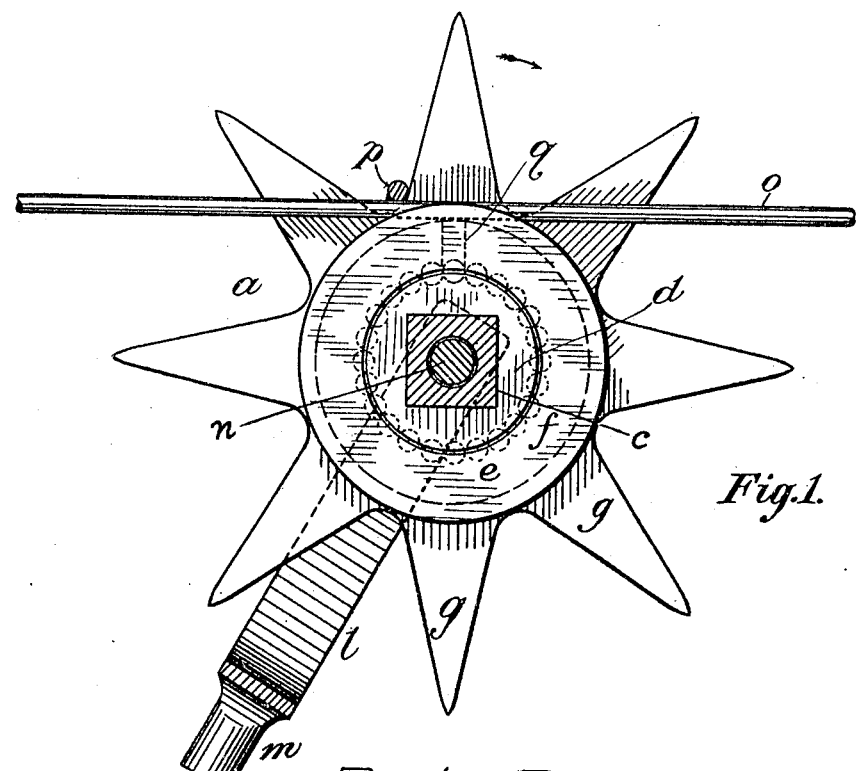
Figure 2:
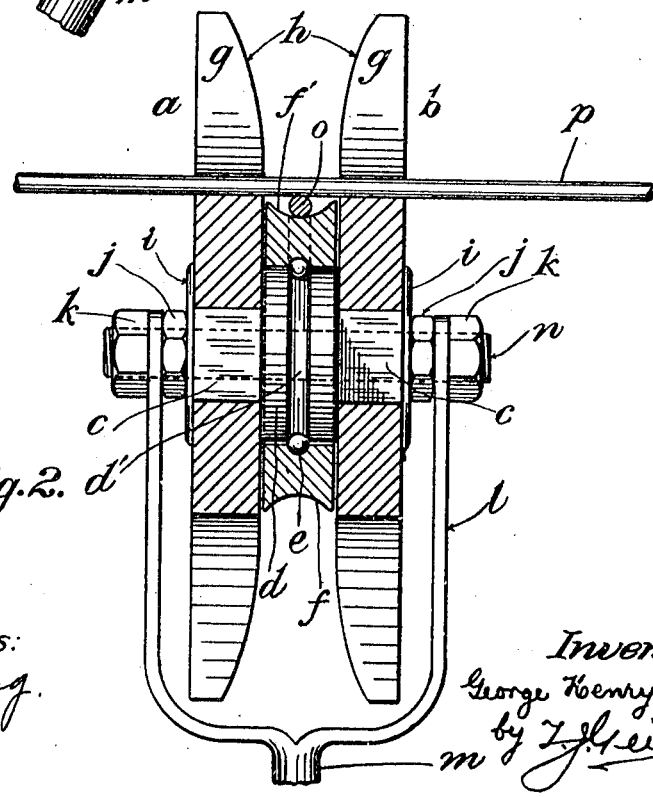

In the drawings: Figure 1 is a side elevation of the upper end of a trolley-pole provided with my improved trolley-wheel, the near side of which is removed; the view representing my trolley-wheel in the act of passing over a cross suspending-wire; and Fig. 2 is a central transverse section of my trolley-wheel, also representing the same in the act of passing over a cross-wire.

The letters designate the parts described.

My trolley-wheel consists of two sides $a$, $b$, centrally perforated and non-rotatably mounted on a hollow axle-pin. Said axle-pin consists of a central annular part $d$, and reduced laterally projecting square portions $c$, $c$, on which the sides are secured. The periphery of said central annular part $d$ is made with a groove $d'$, in which to receive ball-bearings $e$. A bolt $n$, having threaded ends, and nuts $j$ thereon fasten the parts together.

Intermediate of the sides $a$, $b$ there is rotatably mounted on the ball-bearings, $e$, $e$ wheel $f$, grooved on its interior face so as to provide a half seat for said ball-bearings $e$, and the outer face of the wheel $f$ being made with a groove $f'$, to receive the trolley-wire. The rims of the sides $a$, $b$ are divided into a plurality of radial spoke-like sections $g$, the inner faces $h$ of which rim-portions are convexed, similarly to the facial construction of the rim of the present-style trolley-wheel. The spoke-shaped rim portions $g$ of the sides $a$, $b$ constitute the flange for the wheel $f$. The spoke-like rim-portions of the sides are kept in alinement by being non-rotatably mounted on said axle-pin.

Exterior of the sides $a$, $b$ are provided washers $i$, and on the threaded extremities of the axle-pin $n$ are nuts $j$, $k$, arranged to receive between them the perforated upper end of the trolley-fork $l$ of the trolley-pole $m$. The annular part $d$ is so arranged as to prevent binding of the wheel $f$ when tightening the nuts $j$, $k$.

In running on the trolley-wire $o$, the wheel $f$ alone rotates, but as my trolley-wire approaches a cross-wire $p$, the rim-portions $g$ of the sides $a$, $b$ engage with said crossing wire, and the sides will be rotated as indicated by the arrow in Fig. 1. In other words, the spoke-like rim-sections $g$ of the sides $a$, $b$ just roll over the crossing wire $p$, as it were; and under all circumstances said rim-sections of the sides $a$, $b$ will operate to hold my trolley-wheel in place on the trolley-wire.

In Fig. 1, $q$ represents a hole in the rim of the trolley-wheel $f$, through which to introduce the ball-bearings $e$, the hole $q$ being threaded and closed by a threaded plug.

Of course, the above given details of description may be varied without departing from the spirit of my invention, and I therefore do not confine myself to said details.

I claim:

1. In combination with the fork of a trolley-pole, a journal-pin having reduced square portions at its ends, an annular central part, a wheel rotatably mounted on such annular central part, and sides provided with square eyes mounted on said square portions of the journal-pin exterior of the wheel; the rim-portions of said sides being divided into a plurality of spoke-like projections adapted to straddle a cross wire and constituting the flanges for said wheel; and means for holding the sides in place on the journal-pin.

2. In combination with the fork of a trolley-pole, a journal-pin having square shank-portions near its ends, an annular boss formed centrally on the journal-pin, a wheel rotatably mounted on such boss, sides provided with square eyes mounted on said square shank-portions exterior of the wheel, the rim-portions of said sides being divided into a plurality of spoke-like projections, adapted to straddle a cross wire, and constituting the flanges for said wheel, and nuts on the extremities of the journal-pin.

3. In combination with the fork of a trolley-pole, a journal-pin having square shank-portions near its ends, an annular boss formed centrally on the journal-pin, a wheel rotatably mounted on such boss, ball-bearings interposed between the bearing faces of said boss and said wheel, sides provided with square eyes mounted on said square shank-portions exterior of the wheel, the rim-portions of said sides being divided into a plurality of spoke-like projections, adapted to straddle a cross wire, and constituting the flanges for said wheel, and nuts on the extremities of the journal-pin.

GEORGE HENRY DOWNS.

Witnesses:
W. R. PEARSON,
V. A. WEBB.